United States Patent [19]

Meyer

[11] Patent Number: 5,298,049
[45] Date of Patent: Mar. 29, 1994

[54] TROUGH SYSTEM

[75] Inventor: Willi Meyer, Effretikon, Switzerland

[73] Assignee: Emhart Glass Machinery Investments Inc., Wilmington, Del.

[21] Appl. No.: 27,074

[22] Filed: Mar. 5, 1993

[30] Foreign Application Priority Data

Mar. 28, 1992 [GB] United Kingdom ............... 9206830

[51] Int. Cl.⁵ ............................................. C03B 7/16
[52] U.S. Cl. ....................................... 65/225; 65/304; 193/22; 193/15
[58] Field of Search ............... 65/304, 225, 207, 223, 65/224; 193/22, 15

[56] References Cited

U.S. PATENT DOCUMENTS

| | | | |
|---|---|---|---|
| 3,341,315 | 9/1967 | Patschorke | 65/304 |
| 4,002,453 | 1/1977 | Becker | 65/229 |
| 4,566,894 | 1/1986 | Kulig | 65/304 |
| 5,213,602 | 5/1993 | Foster et al. | 65/304 |
| 5,254,150 | 10/1993 | Riemer | 65/304 |

FOREIGN PATENT DOCUMENTS 0118293 2/1984 European Pat. Off. .
0480642 10/1991 European Pat. Off. .
9220631 11/1992 World Int. Prop. O. .

Primary Examiner—W. Gary Jones
Assistant Examiner—John Hoffmann
Attorney, Agent, or Firm—Spencer T. Smith

[57] ABSTRACT

A trough system for the delivery of a gob of molten glass from a gob distributor to a parison mould cavity in a glassware forming machine comprises a trough assembly comprising an upwardly facing inclined trough which is arranged to receive a gob from a scoop of the gob distributor and a downwardly facing deflector which deflects a gob which has travelled down the trough into a vertical path to fall into the parison mould cavity. The deflector and the trough are mounted on a hanger which is supported in a frame member of the machine by a universal joint adjustable about three perpendicular axes. Consequently adjustment of the position of the deflector may be made without causing misalignment of the deflector and the trough.

4 Claims, 5 Drawing Sheets

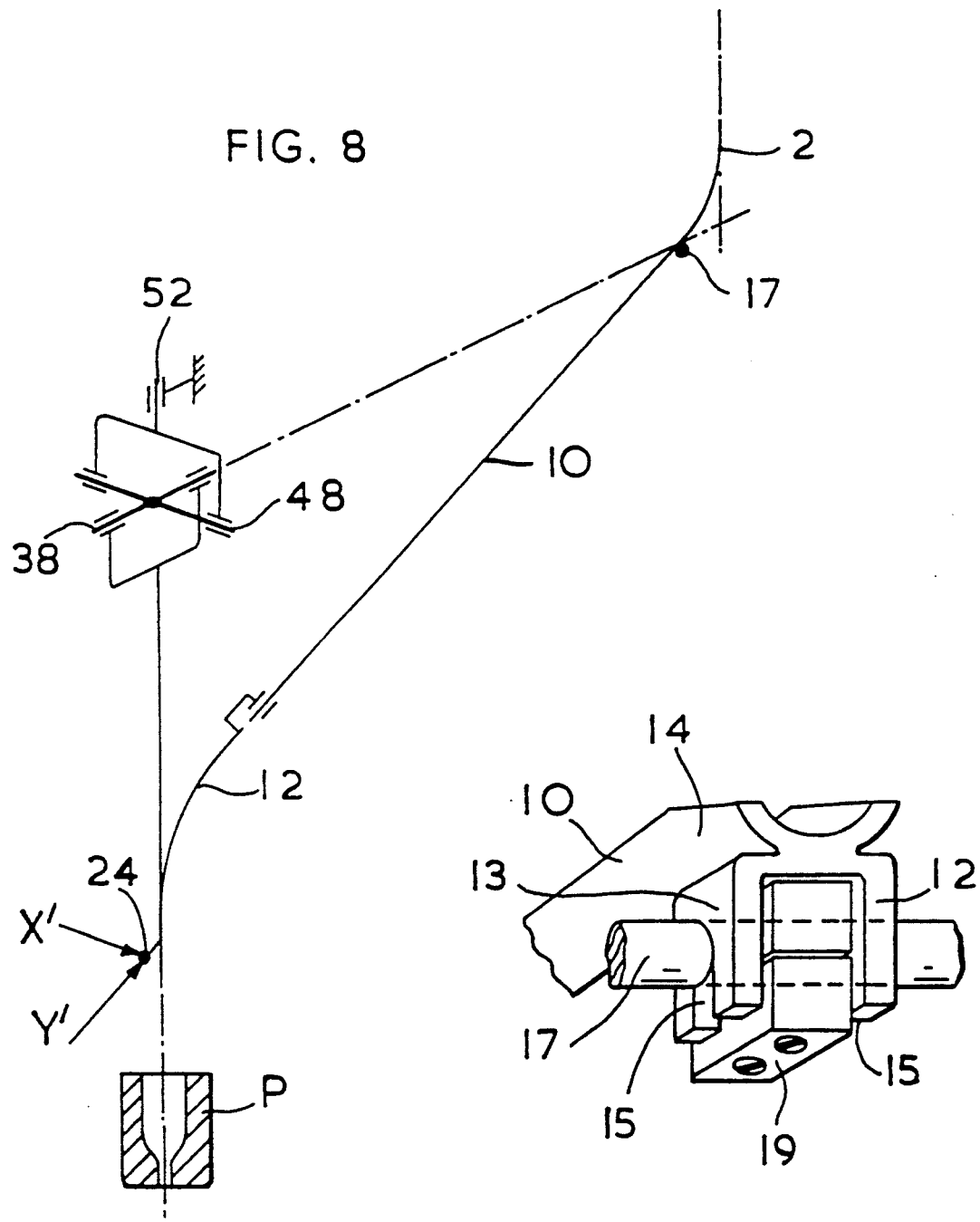

TROUGH SYSTEM

BACKGROUND OF THE INVENTION

The present invention relates to improvements in means for delivering gobs of glass to the moulds of glassware forming machines.

In the well known I.S. type of glassware forming machines, a number [generally from 8 to 16] of individual sections of the same construction are mounted side by side, and are arranged to operate out of phase with each other so that a substantially continuous flow of formed glassware is produced. Each section normally contains parison forming moulds and blow moulds, and may be constructed to receive 1,2,3 or 4 gobs of molten glass at a time into the corresponding number of parison moulds, in which the gobs are formed into parisons, which parisons are then transferred to the blow moulds and formed into the desired shape.

The gobs are supplied to the parison moulds through a trough system to which gobs are provided by a gob distributor. The trough system comprises a trough assembly associated with each section, and the gob distributor is arranged to provide the required number of gobs to each trough assembly in turn through a number of scoops which are moved into alignment with upper end portions of the trough assembly.

Each trough assembly comprises, associated with each mould cavity of the section, an upwardly facing inclined trough, which carries a gob from the scoop into a position above and to one side of the parison mould, and a downwardly facing deflector which deflects a gob travelling down the trough into a vertical path to fall into the cavity of the parison mould.

It can be seen that, for each gob, a pathway is provided by the scoop, the upwardly facing trough and the downwardly facing deflector. It is essential, to ensure that a gob arrives at the parison mould in its desired condition, that this pathway is smooth and does not comprise any changes of direction in a vertical plane. Consequently it is necessary to ensure that the three components are accurately aligned, in particular that, viewed in plan, there is no 'dog leg' formed.

The alignment and orientation of the scoop is determined by the gob distributor.

The trough has an upper end portion which comprises two downwardly facing slotted lugs, which are fitted over a supporting rod which extends arcuately across the machine, and is located transversely on the rod by a locating block fixed to the rod and lying between the slotted lugs. A small amount of play length wise of the rod may occur, and the trough is free to move angularly about the rod in a vertical plane.

A lower end portion of the trough is supported by a complex bracket which is supported by a hanger from a beam extending transversely across the machine.

The deflector comprises an upper end portion which is supported by the aforementioned bracket, and a lower end portion which has a transverse lug with a vertical bore in it. This bore fits over a locating pin which is adjustable about x and y axes to enable adjustment of the position of the lower end portion of the deflector in relation to the associated mould cavity.

When it is necessary, in the operation of the machine, to adjust the position of the deflector, for example if there is a change of gob size, the position of the locating pin is adjusted to move the lower end portion of the deflector into the desired position. During operation of the machine it is in general not feasible to adjust the bracket which supports the upper end portion of the deflector and the lower end portion of the trough and consequently such adjustment of the deflector may cause the deflector and the trough to become misaligned into a 'dog leg', which can cause irregularities in the shape of the gob delivered to the mould and in its delivery time.

It is one of the objects of the present invention to provide an improved means for mounting a trough and a deflector in a trough assembly which is more easily adjusted than previously possible.

SUMMARY OF THE INVENTION

The present invention provides in one of its aspects a trough assembly for the delivery of a gob of molten glass from a gob distributor to a parison mould cavity in a glassware forming maching comprising an upward facing inclined trough for receiving a gob from a scoop of a gob distributor a downwardly facing deflector for deflecting a gob which has travelled down said trough into a vertical path to fall into the parison mould cavity a hanger for supporting said trough and said deflector and a universal joint adjustable about three perpendicular axes for supporting said hanger.

The present invention provides in another of its aspects a trough assembly in a glassware forming machine which comprises a machine frame and a parison mould having a cavity to which a gob of molten glass is delivered in the operation of the machine from a gob distributor the trough assembly comprising an upwardly facing inclined trough for receiving a gob from the gob distributor, an upper end portion of said trough being supported by the frame of the machine a downwardly facing deflector for deflecting a gob which has travelled down said trough into a vertical path to fall into a parison mould cavity a hanger which supports said deflector and a lower end portion of said trough and a universal joint adjustable about three perpendicular axes mounted in the frame of the machine and supporting said hanger.

The present invention provides in yet another of its aspects a trough system for use with an individual section in a multi-gob glassware forming machine which comprises a machine frame and a number of individual sections each comprising a plurality of parison moulds, each parison mould having a cavity to which a gob of molten glass is delivered in the operation of the machine from a gob distributor, the trough system comprising a plurality of trough assemblies, one trough assembly being associated with each parison mould each trough assembly comprising an upwardly facing inclined trough for receiving a gob from the gob distributor an upper end portion of said trough being supported by the frame of the machine a downwardly facing deflector for deflecting a gob which has travelled down said trough into a vertical path to fall into the associated parison mould cavity and a hanger which supports said deflector and a lower end portion of said trough the hanger being supported by a universal joint adjustable about three perpendicular axis and mounted in the frame of the machine.

DESCRIPTION OF THE INVENTION

In the accompanying drawings

FIG. 8 is a diagrammatic view of the first trough assembly;

FIG. 9 shows a support for a trough of a trough assembly.

Figure 1:
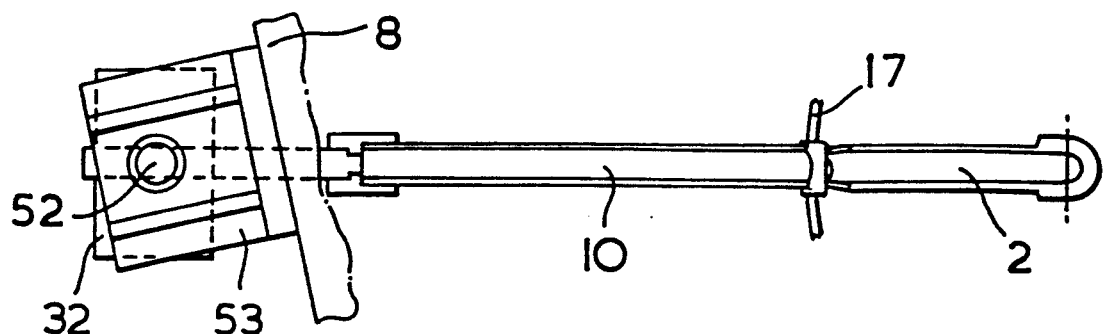
FIG. 1 is a plan view of a first trough assembly in a glassware forming machine.
Figure 2:
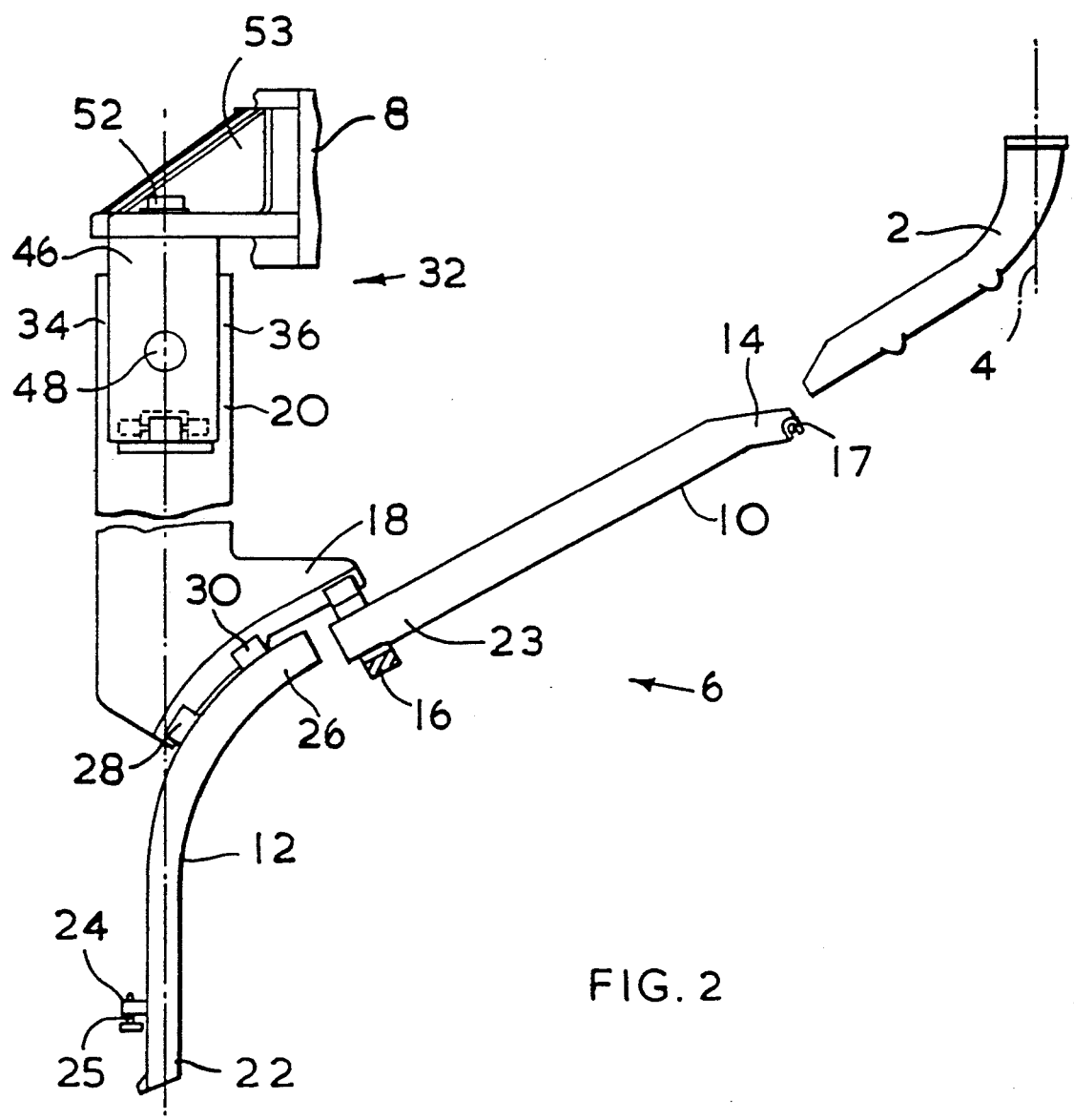
FIG. 2 is a side view of the assembly shown in FIG. 1.
Figure 3:
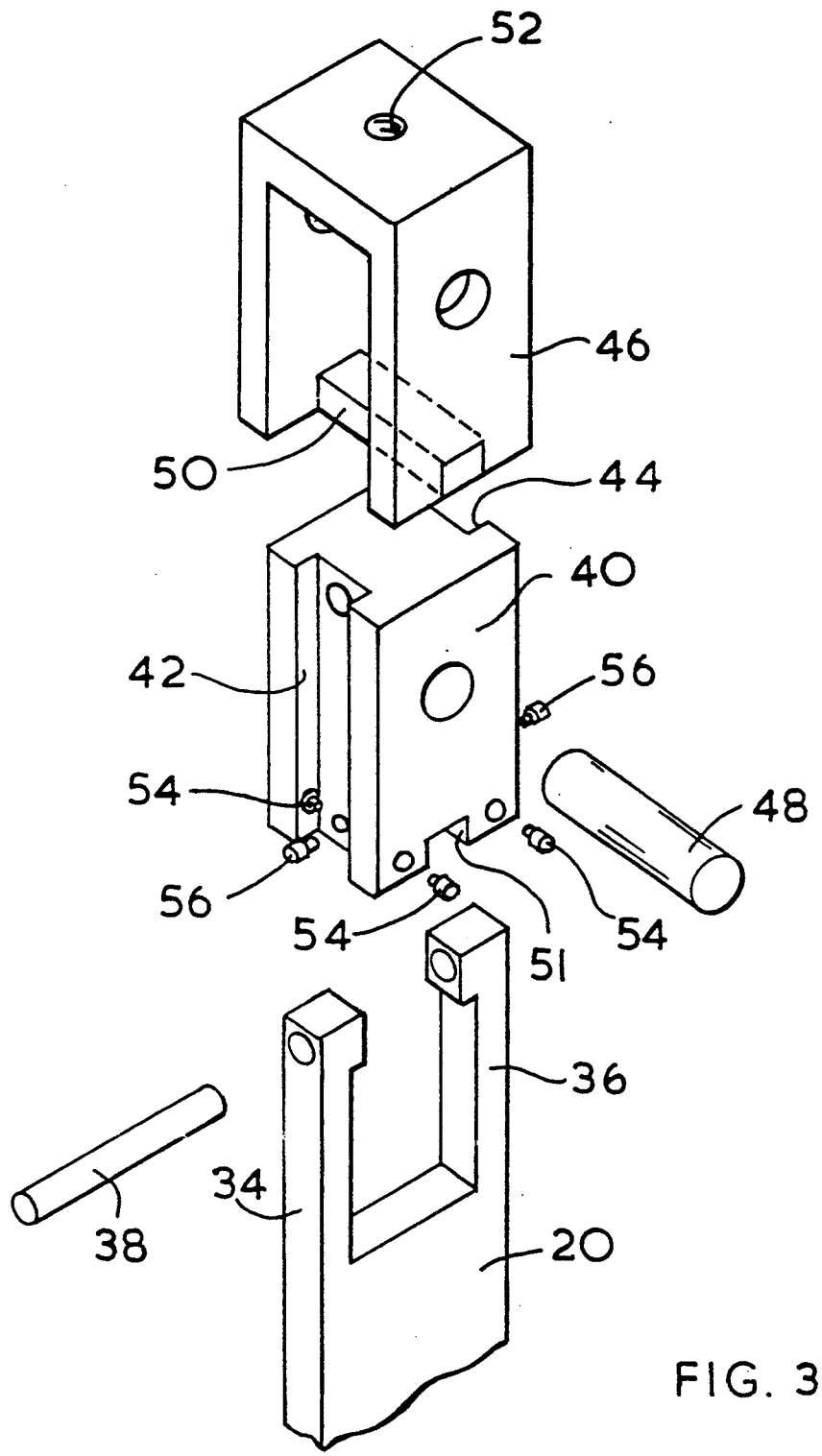
FIG. 3 is an exploded view of a universal joint shown in FIG. 1.

A first trough assembly, for use in a single gob glassware forming machine, is shown in FIGS. 1, 2 and 3.

A gob distributor (not shown) comprises a scoop 2 which can be moved about a vertical axis 4 to bring it into line in turn with each of the trough assemblies 6 which lead to parison moulds of the forming machine (not shown).

The forming machine is provided with a beam 8 which extends across all the sections of the machine generally vertically above the parison moulds of the machine. The trough assembly comprises the scoop 2, an upwardly facing inclined trough 10, and a downwardly facing deflector 12. The trough 10 has an upper end portion 14 which comprises two spaced downwardly extending lugs 13, each having a slot 15. Secured to a rod 17, which extends across the forming machine in a curve around the gob distributor, is a clamp block 19. The trough 10 hangs on the rod 17 with the rod 17 in the slots 15 and the lugs 13 on opposite sides of the block 19. The trough 10 is thus free to move angularly about the rod 17, and is capable of limited angular movement with respect to the block 19 about a vertical axis as there is a certain amount of play between the block 19 and the lugs 13.

The upper end portion 14 is thus held in alignment with the scoop 2 when the scoop is in its appropriate position. A lower end portion of the trough 10 is mounted in a bracket 16 which is secured to a support member 18 of a hanger 20. The deflector 12 has a lower end portion 22 which has a lug 24 with a vertical hole in it: this lug is fitted over a pin 25 which is secured in the machine and is capable of limited adjustment in a horizontal plane so that the precise position of the lower end portion 22 can be adjusted. An upper end portion 26 of the deflector is also secured to the support member 18 by two brackets 28, 30.

It can be seen that by appropriate adjustment of the pin 25 the lower end portion 22 of the deflector 12 can be correctly positioned over the parison mould of the section. The deflector 12 and the trough 10 are aligned with each other and secured in position by the brackets 16, 28 and 30.

The hanger 20 is supported from the beam 8 by a universal joint 32 which can accommodate movement of the hanger 20 about three perpendicular axes. An upper end portion of the hanger 20 comprises two spaced arms 34, 36 which are pivoted by a generally horizontal shaft 38 in a block 40, the arms 34, 36 lying in grooves 42, 44 in opposite faces of the block which allow a small amount of movement about the shaft 38. The block 40 lies between the arms of a downwardly facing yoke 46, and is pivoted about a generally horizontal shaft 48, perpendicular to the shaft 38. A bar 50 is secured between the two arms of the yoke 46 and lies in a slot 51 in the block 40, thus allowing limited pivotal movement of the block 40 about the shaft 48. The yoke 46 is pivoted to a bracket 53 fixed to the beam 8 about a vertical shaft 52, perpendicular to both the shafts 48 and 38. Adjustable spring loaded damping pins 54 in the block 40 restrain the pivotal movement of the hanger about the shaft 38, and adjustable spring loaded damping pins 56, by engagement with the bar 50, restrain the pivotal movement of the block 40 about the shaft 48.

FIG. 8, shows diagrammatically, the adjustment of the trough assembly 6.

It will be seen that the axis of the shaft 52 is substantially aligned with the centre of the parison mould P, that is to say with the vertical path of the gob moving down the deflector 12. The bracket 53 is fixed to a machined face of the beam 8, and can thus be properly positioned to align the shaft 52 correctly. However, adjustment of the deflector 12 by the adjustment of the position of the lug 24 to ensure that the deflector 12 is aligned with the parison mould P can be carried out without requiring careful adjustment of the upper end portion of the deflector 12 and realignment with the trough 10 as small adjusting movements are accommodated by the universal joint 32 and also by the small amount of play between the upper end portion of the trough 10 and the rod 17. Setting up and alignment of the trough assembly is thus greatly simplified.

Figure 5:
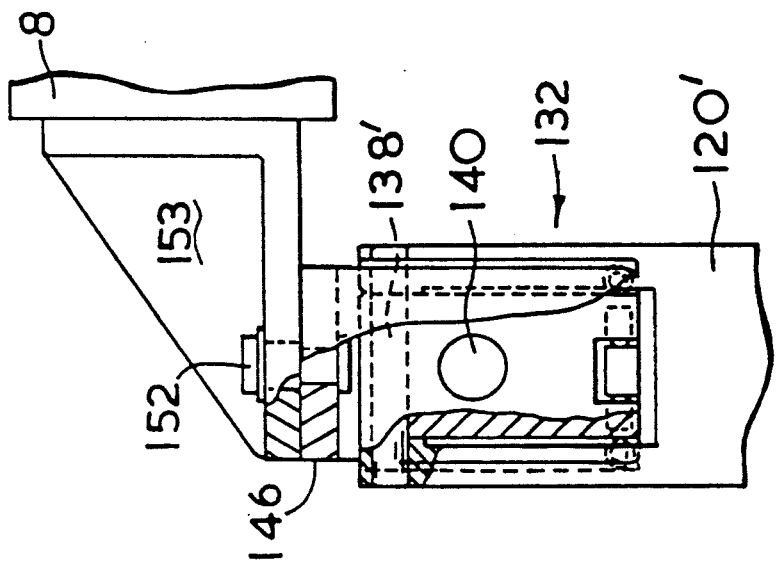
FIG. 5 is a side view of parts shown in FIG. 4.
Figure 4:
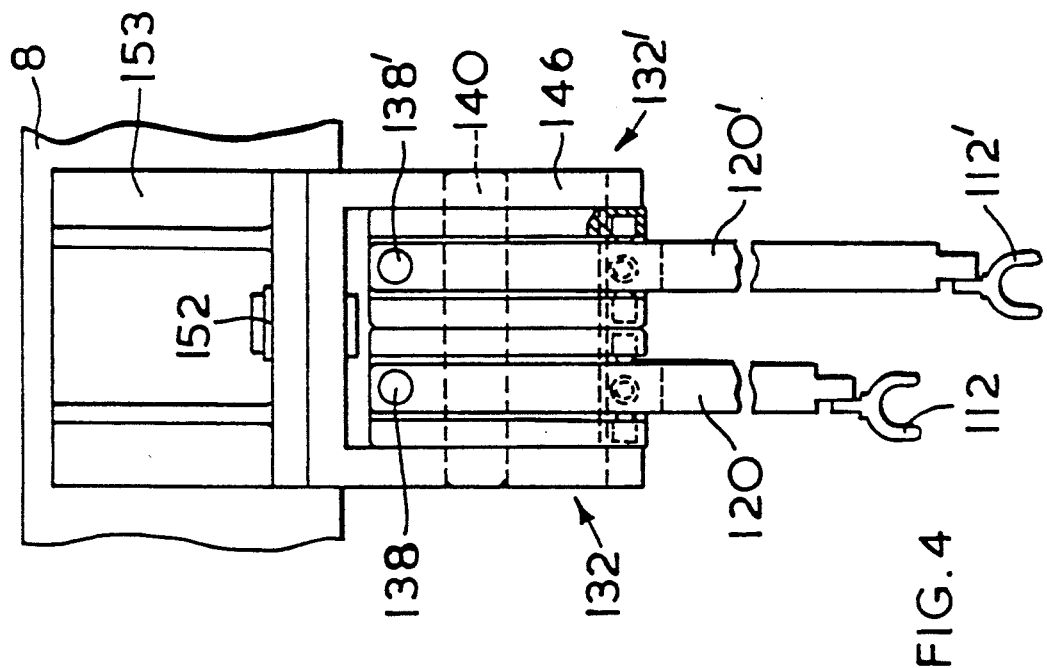
FIG. 4 is a front view of a second trough assembly for use in a double gob glassware forming machine.

A second trough system for use in a double gob glassware forming machine is shown in FIGS. 4 and 5. This trough system comprises two trough assemblies and because the construction of each trough assembly is similar to that of the first assembly they will not be described in detail.

Each trough assembly comprises a deflector 112, 112', each of which in the operation of the machine is aligned with one cavity of a two cavity parison mould assembly, and a scoop and a trough (not shown) associated with each deflector. The deflector 112, with its associated trough, is supported by a hanger 120 supported by a universal joint 132 which comprises a first, generally horizontal shaft 138, and a second generally horizontal shaft 140 in a yoke 146. The yoke 146 is pivoted about a vertical shaft 152 which is mounted in a bracket 153 fixed to the beam 8.

The deflector 112', with its associated trough, is supported by a hanger 120' supported by a universal joint 132' which comprises a first, generally horizontal shaft 138'. The universal joint 132' also comprises the shaft 140 in the yoke 146. The vertical shaft 152 is positioned centrally of the two universal joints 132, 132'. Thus the universal joints 132, 132' of each of the trough assemblies have a common horizontal axis 140 and a common vertical axis 152.

The operation of the second trough system will be understood from the foregoing description of the first trough system.

Figure 6:
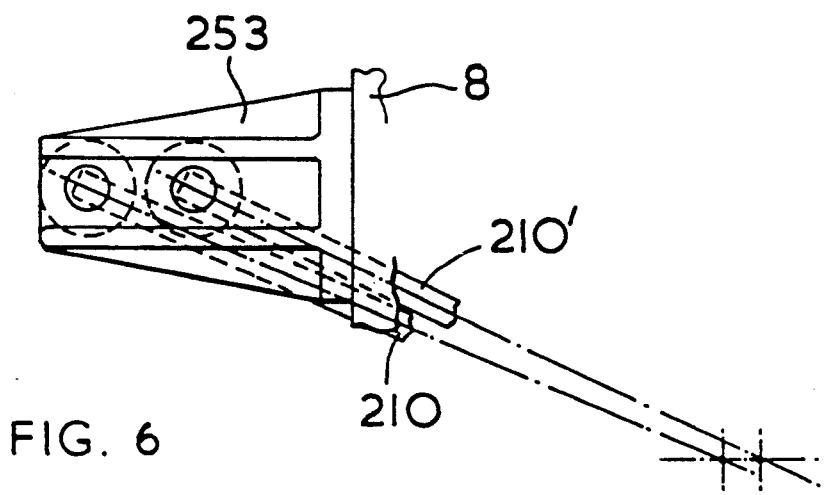
FIG. 6 is a diagrammatic plan view of an alternative trough assembly for use in a double gob machine.
Figure 7:
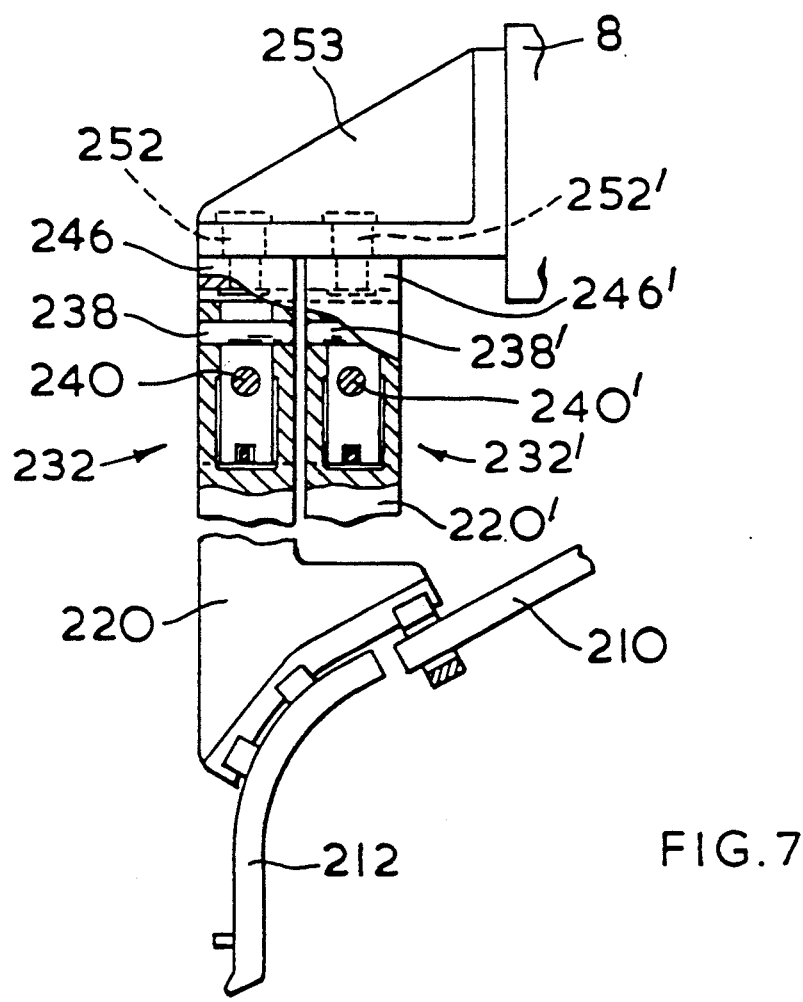
FIG. 7 is a side view of the trough assembly of FIG. 6.

A third trough system for use in a double gob glassware forming machine is shown in FIGS. 6 and 7. This trough assembly resembles the second trough system except that the trough and deflector of each trough assembly is supported by a separate independent universal joint mounted for rotation about distinct vertical axes, rather than, as in the second assembly, sharing a single vertical pivot.

In FIG. 7 a deflector 212 is shown, which in the operation of the machine is aligned with one cavity of a two cavity parison mould assembly. The other deflector is only indicated diagrammatically in FIG. 6.

The deflector 212 with its associated trough 210 is supported by a hanger 220 supported by a universal joint 232 which comprises a first, generally horizontal shaft 238, and a second generally horizontal shaft 240 in a yoke 246. The yoke 246 is pivoted about a vertical shaft 252 which is mounted in a bracket 253 fixed to the beam 8.

The second deflector with its associated trough 210' (FIG. 7) is supported by a hanger 220' supported by a universal joint 232' which comprises a first, generally horizontal shaft 238' and a second generally horizontal shaft 240' in a yoke 246'.

The yoke 246' is pivoted about a vertical shaft 252' which is also mounted in the bracket 253. The spacing of the axes of the two shafts 252, 252' is equal to the spacing of the two mould cavities, and each shaft is vertically aligned with the centre of its respective mould cavity.

Again the operation of this third trough system will be understood from the previous description. It will also be apparent that the second and third trough system can readily be adapted for use with multi-gob machines, that is comprising three or four parison moulds per section.

What is claimed is:

1. An assembly for guiding a gob of molten glass comprising
   an upwardly facing inclined trough for receiving a gob at the upper end thereof,
   a downwardly facing deflector for deflecting a gob received from the lower end of said trough into a vertical downward path,
   a vertical support bracket,
   means for securing said deflector on said vertical support bracket,
   a block,
   means for mounting said vertical support bracket on said block for pivotal displacement about a first horizontal axis,
   means for restraining pivotal displacement of said vertical support bracket from a selected pivotal position relative to said block,
   a yoke,
   means for mounting said block on said yoke for pivotal displacement about a second horizontal axis perpendicular to said first horizontal axis,
   means for restraining pivotal displacement of said block from a selected pivotal position relative to said yoke, and
   means for supporting said yoke for displacement about a vertical axis perpendicular to said first and second horizontal axes.

2. An assembly for guiding a gob of molten glass according to claim 1, wherein said vertical axis defines said vertical downward path.

3. An assembly for guiding a gob of molten glass according to claim 2, wherein said block has vertically opposed side surfaces, each having a vertically extending slot therein, said vertical support bracket includes a pair of spaced, upwardly extending legs located within said slots and said means for mounting said vertical support bracket on said block comprises shaft means interconnecting the top portion of said legs to said block.

4. An assembly for guiding a gob of molten glass according to claim 3 wherein said block has a bottom surface having a slot therein parallel to said second horizontal axis and said yoke includes a locating block located within said slot and selectively configured to permit limited pivotal displacement of said block relative to said yoke about said second horizontal axis.

* * * * *